2,941,973
Patented June 21, 1960

United States Patent Office

2,941,973
MODIFIED HYDROLYZED ETHYLENE VINYL ESTER INTERPOLYMERS

Miles Charles Kumnick and Frederick Kingsbury Watson, Wilmington, Del., assignors to E. I. du Pont de Nemours and Company, Wilmington, Del., a corporation of Delaware No Drawing. Filed Apr. 29, 1955, Ser. No. 505,036

14 Claims. (Cl. 260—30.6)

This invention relates to hydrolyzed ethylene-vinyl ester interpolymers and more particularly to modified hydrolyzed ethylene-vinyl ester interpolymers useful in the preparation of safety glass.

It had heretofore been known that hydrolyzed ethylene-vinyl ester interpolymers could be used as adhesive interlayers in laminated glass. In contrast to the better known polyvinyl acetal resins, the hydrolyzed ethylene-vinyl ester resins have not found wide use as safety glass interlayers because of their lower toughness particularly at lower temperatures, their embrittlement on long term exposure and their lower adhesiveness as compared to the polyvinyl acetal resins at low temperatures. It was however known that the hydrolyzed ethylene-vinyl ester interpolymers possessed good adhesion to glass at temperatures of 20° C. and above. In addition certain processing advantages of hydrolyzed ethylene-vinyl ester interpolymers over polyvinyl acetal resins, such as dimensional stability at high temperatures and nontackiness of the polymer at processing temperatures make it extremely desirable to use the hydrolyzed ethylene-vinyl ester interpolymers as safety glass interlayer.

The disadvantage of the hydrolyzed ethylene-vinyl ester interpolymers as a safety glass resin suggests that the deficiencies of the interpolymer may be eliminated by the addition of a modifier. It is well known that plasticizers often increase the toughness of the resin in which they are used. Although there is at the present time a great multitude of such plasticizers available for thermoplastic polymers, most of these apply to particular polymers only and cannot be used as plasticizers in safety glass interlayers because of the strict requirements that must be met by a plasticizer for safety glass interlayer. Such specifications include that the plasticizer be compatible with the resin in sufficient quantities to cause plasticization, the compatibility being dependent on the polymer as well as the plasticizer; that the plasticizer will not affect the adhesiveness of the resin to glass; that the plasticizer will not decrease the optical clarity necessary in safety glass; that the plasticizer will not decompose on long term exposure to light, moisture and moderate temperature, thus affecting the adhesion, optical properties of the interlayer, or embrittling the resin; that the plasticizer will not exude, separate or volatilize from the interlayer on lamination, in addition to the basic property of softening the resin and increasing its toughness.

It is therefore the objective of this invention to prepare improved, modified polymer compositions of hydrolyzed ethylene-vinyl ester resins. A further object is to prepare modified polymer compositions of hydrolyzed ethylene-vinyl ester interpolymers for use as interlayers in safety glass. Yet another object is to provide modified polymer compositions of hydrolyzed ethylene-vinyl ester interpolymers which give improved safety glass of greater toughness and strength. Another object is to prepare safety glass interlayer resins which are non tacky and dimensionally stable at elevated temperatures. Still a further object is to prepare hydrolyzed ethylene-vinyl ester interpolymer compositions which adhere well to glass at low temperatures and do not embrittle on long term exposure when laminated between glass. Other objects will be apparent hereinafter.

The objects are accomplished by this invention, which comprises admixing with a hydrolyzed ethylene-vinyl ester interpolymer, organic phosphorus compounds of the class consisting of alkyl acid phosphites, alkyl acid phosphates and phosphinic acids which, on heating to curing and glass laminating temperatures, crosslink the polymer to form outstanding safety glass laminates. The surprising features of these compounds are not only that they plasticize the polymer to avoid embrittlement during fabrication, but that in addition they are stable and unreactive at mixing and fabrication temperatures and then crosslink rapidly at laminating temperatures to improve toughness of the hydrolyzed ethylene-vinyl ester interlayer resin and furthermore when laminated result in better adhesion of the polymer to the glass as well as improved optical properties and increased flexural and impact strength of the glass laminate. By being substantially bonded to the polymer chain the above said compounds do not separate, exude or cause embrittlement of the polymer after lamination. In regard to heat-, light- and moisture-stability laminates made from the compositions of this invention are essentially equivalent to or improved over polyvinyl acetal resin laminates.

The expression vinyl ester as used herein refers to a vinyl ester of an organic acid. The preferred ethylene-vinyl ester interpolymers for use in this invention are the ethylene-vinyl acetate interpolymers which are conveniently prepared as follows: A pressure vessel is charged with vinyl acetate, water, an emulsifying agent, a buffer and a catalyst, e.g. an organic peroxide. This mixture is blanketed with nitrogen evacuated to exclude atmospheric oxygen; then ethylene gas is admitted until the desired pressure is obtained. The pressure vessel is heated to 65–75° C. and agitated for 5 to 14 hours. The interpolymer is separated from the reaction mixture by coagulation and volatile impurities are removed by steam distillation. The interpolymer is washed and dried. Interpolymers so formed are smoothly hydrolyzed to the corresponding polymeric alcohols in methanol, ethanol, methanol-toluene using either in acid or a base as the hydrolyzing agent. The hydrolysis of ethylene vinyl acetate interpolymers is more completely described in U.S. Patent 2,386,347. Although the interpolymers of ethylene and vinyl acetate are preferred, it should be realized that any vinyl ester monomer can be used, as essentially the same result, namely a hydroxyl group, is obtained on hydrolysis. Vinyl acetate is preferred primarily because of its low cost and availability.

Although it is possible to prepare a wide range of interpolymers which vary in the molar ratio of the ethylene to the vinyl acetate used in the polymerization it has been found that for high quality safety glass resin certain compositions of the interpolymers are preferred. It has been found that the useful range of interpolymers of ethylene and vinyl acetate for safety glass purposes with regard to the monomer ratio lies between an ethylene to vinyl acetate ratio of 1.5/1 to 5/1. If the ratio is reduced to below 1.5/1 the modified interpolymers lack the toughness necessary for a satisfactory safety glass resin. If the ratio is increased beyond 5/1 the adhesiveness to glass is reduced, and many of the modifying agents become incompatible with the polymer to the extent that the beneficial action of the modifier is substantially reduced. The preferred ratios of ethylene to vinyl acetate in the interpolymers of this invention range from 2.5/1 to 3.5/1 and a particularly useful ratio is 3/1. To be useful as interlayer resins in safety glass the interpolymers of ethylene and vinyl acetate must have a certain minimum molecular weight, below which they are brittle and not useful in the lamination of safety glass. Satisfactory toughness of the resin is achieved, when the polymers have approximately an inherent viscosity of one in tetrahydronaphthalene. As stated hereinabove hydrolyzed interpolymers of ethylene and vinyl acetate are used in the process of this invention; by this is meant interpolymers which have been hydrolyzed to the extent that 80–100% of the ester groups are changed to hydroxyl groups. It is possible to use interpolymers of a lower degree of hydrolysis. However, better properties are achieved with essentially completely, 96–100%, hydrolyzed polymers and they are for that reason preferred.

The modifiers used in the present invention are certain organic phosphorus compounds which contain at least one reactive hydrogen. It is believed that the organic phosphorus compounds of the present invention crosslink with the hydroxyl groups of the polymer through transesterification under acidic conditions. It is believed to be a crosslinking reaction because excessive heating of the modified compositions of this invention will lead to intractable materials. This however does not affect the use of these modified interpolymers since there is no need for tractability once interlayers have been laminated and cured. One of the surprising effects of the modifiers used in the present invention is that substantially no crosslinking occurs at temperatures where the polymer is admixed with the modifier, and fabricated into interlayer sheets. Temperatures useful for such purposes range from 100 to 140° C. Crosslinking of the modifiers used in the present invention occurs in the range of 160° C. to 190° C. at which temperatures the glass lamination is carried out. Of course glass laminates may be prepared at lower temperatures, but the advantages obtained through crosslinking are not realized.

The organic phosphorus compounds useful in this invention are the alkyl acid ortho phosphates, alkyl acid ortho phosphites and the phosphinic acids, which contain from 3 to 12 carbon atoms in the hydrocarbon radicals. Of these the preferred compounds are those acid phosphates and acid phosphites which have alkyl radicals containing from 5 to 9 carbon atoms per radical. Either the mono- or the diacid phosphates and phosphites or mixtures of the mono- and diacid esters may be used although the diphosphates and diphosphites are preferred. Of the phosphinic acids, the benzene phosphinic acid is preferred. The modified interpolymers of this invention do not have to be crosslinked completely to achieve optimum properties in the laminate; it is sufficient that a major amount of the polymer is crosslinked. Thus it is desirable and important that the modifiers used are compatible with the polymer and that they do not volatilize extensively when compounded with the polymer and when in contact with heat or moisture on storage. The optimum length of the alkyl chain is therefore established by these properties which may vary slightly with each individual organic phosphorus modifier used. In general however alkyl chains having less than 3 carbon atoms volatilize readily and are therefore avoided. Furthermore their increased reactivity will lead to premature crosslinking. Alkyl chains having carbon atoms greater than 12 on the other hand are not sufficiently compatible and are of low reactivity. In using phosphinic acids, benzene phosphinic acid is preferred, since phosphinic acids with a greater number of carbon atoms in the aryl radical are incompatible, whereas phosphinic acids with lower number of carbon atoms or those having alkyl side chains are too reactive. Even in using benzene phosphinic acid, the lower limit of the amount necessary for modification is the maximum compatibility limit. The modifiers used in the present invention are commercially available or can be prepared by the reaction of orthophosphoric acid and orthophosphorus acid with the desired alcohols.

The amounts of the organic phosphorus modifier to be added to the hydrolyzed ethylene-vinyl acetate polymers may be varied considerably from 20 to 40% by weight of the total composition. The preferred optimum amounts to be added depend to some extent on the individual modifier used. As stated hereinabove modifiers vary in their compatibility, reactivity as well as in their volatility. However, in general, quantities of 25 to 35% by weight of the composition will give the desired outstanding results of this invention. Where compatibility is limited, two or more modifiers may be added to give the necessary total amount for optimum properties.

The present invention is further illustrated by the examples hereinbelow, which are not intended to limit the scope of this invention but are purely illustrative. Unless otherwise stated all parts are by weight.

*Example 1.*—77 parts of 100% hydrolyzed ethylene-vinyl acetate interpolymer having a molar ratio of ethylene to vinyl acetate of 3:1 was milled with 23 parts of dioctylphosphite at a temperature of 125° C. until a homogeneous mass was obtained. The treated polymer was molded into 14" x 14" x 2" blocks by heating for 1 hour at 130° C. in a mold under a pressure of 300 p.s.i. The cooled polymer was then cut into 14" x 14", 15 mil thick films. The films were placed between two 12" x 12" glass plates and sealed at the edges first by heating to 65° C. under 30 p.s.i. pressure. The laminates were then heated to 170° C. for a period of 15 minutes under a pressure of 225 p.s.i. resulting in optically clear safety glass. The glass laminates prepared in this manner were compared to similarly prepared glass laminates using the following interlayer resins, unmodified hydrolyzed ethylene vinyl acetate resin, hydrolyzed ethylene vinyl acetate resin containing 23% dioctyl phosphite which had not been heated sufficiently to cause crosslinking, e.g. below 160° C., and commercial polyvinyl butyral resin. The comparative test used was the break height test in which ½ lb. steel ball is dropped onto the laminate and the height at which the ball causes one half of the laminate to break or shatter is measured. The cured non-laminated interlayers of this invention were further compared to unmodified hydrolyzed ethylene vinyl acetate polymer sheeting, to the uncured sheeting, and to commercial polyvinyl butyral sheeting by a pneumatic impact test, in which the pneumatic impact toughness is measured by shooting a steel ball through the unsupported sheeting. The results in the table below show the outstanding toughness and adhesion properties obtained at low as well as high temperatures with modified, cured hydrolyzed ethylene-vinyl acetate interpolymers and show the improvements made by the addition and curing of the polymer with dioctylphosphite.

*Table I*

| Types of Interlayer | Pneumatic Impact Toughness, ft. lbs./in. | | Break Height Test in ft. (Laminate) | |
| --- | --- | --- | --- | --- |
|  | −18° C. | +50° C. | −18° C. | +50° C. |
| Unmodified hydrolyzed ethylene vinyl acetate polymer | 11 | 57 | 5 | 20 |
| Polymer modified with 23% dioctyl phosphite uncured (laminated at 135° C.) | 32 | 90 | 18 | 12 |
| Modified + cured interlayer of hydrolyzed ethylene vinyl acetate polymer with 23% of dioctyl phosphite | 72 | 98 | 34 | 24 |
| Polyvinyl butyral | 40 | 40 | 22 | 22 |

*Example 2.*—67 parts of a 96.7% hydrolyzed ethylene-vinyl acetate interpolymer, having a molar ratio of ethylene to vinyl acetate of 3/1 was milled with 33 parts of mixed mono- and diisoamyl acid phosphate containing 40% of mono- and 60% of diisoamyl acid phosphate at a temperature of 125° C. until a homogeneous mass was obtained. Glass laminates were prepared from sheeting cut from a molded block of the interpolymer as described in Example 1. In the lamination process the glass was cured for a period of 30 minutes instead of 15 minutes. The laminates were tested for break height, and values of 29 ft. at −18° C., and 22 feet at +50° C. were obtained. The laminates were further tested for flexural modulus and flexural strength and compared to glass sandwiches containing no interlayer resin and to commercial polyvinyl butyral laminates. ASTM test methods were employed. Results listed in the table below show the outstanding adhesion obtained with the modified hydrolyzed ethylene vinyl acetate interlayer.

Table II

| Thickness of Glass used | Nature of Test | No Interlayer | Polyvinyl butyral | Modified HEVA as per Example 2 |
|---|---|---|---|---|
| 105 | Flexural Mod | 1.96×10⁶ p.s.i. | 1.65×10⁶ p.s.i. | 3.78×10⁶ p.s.i. |
|  | Flexural Strgh | 2,590 | 2,670 | 4,860. |
| 120 | Flexural Mod | 2.24×10⁶ p.s.i. | 1.93×10⁶ p.s.i. | 4.1×10⁶ p.s.i. |
|  | Flexural Strgh | 3,340 | 4,570 | 6,230. |
| 135 | Flexural Mod | 2.15×10⁶ p.s.i. | 1.78×10⁶ p.s.i. | 3.34×10⁶ p.s.i. |
|  | Flexural Strgh | 2,650 | 2,780 | 4,870. |

*Example 3.*—Similarly to Example 1 the acid phosphates listed in the table below were milled with hydrolyzed ethylene-vinyl acetate interpolymers in proportion of 33 parts of modifier to 67 parts of polymer. The sheets obtained on molding and cutting the polymer were cured by heating to 170° C. for a period of 5 minutes. The following pneumatic impact values were obtained at various temperatures and are compared to commercial polyvinyl butyral sheeting.

| Temp. | Pneumatic Impact Toughness in Ft. Lbs./In. | | | | |
|---|---|---|---|---|---|
|  | Mixed Mono- and Dibutyl phosphate (40:60) | Mixed Mono- and Diisoamyl phosphate (40:60) | Isoamyl octyl phosphate | Mixed Mono- and dioctyl phosphate (80:20) | Polyvinyl butyral |
| −18 | 77 | 77 | 67 | 57 | 57 |
| −0 | 75 | 76 | 73 | 85 | 60 |
| 23 | 80 | 92 | 94 | 87 | 57 |
| 50 | 60 | 93 | 74 | 68 | 45 |
| 70 | 61 | 69 | 59 | 54 | 27 |

On curing and laminating the above-listed organic phosphate-modified polymers, as described in Example 1, glass laminates of outstanding toughness and adhesion were obtained. The laminates were found to have optical properties equivalent to those of polyvinyl butyral sheeting.

*Example 4.*—67 parts of a 100% hydrolyzed ethylene-vinyl acetate interpolymer, having a molar ethylene to vinyl acetate ratio of 3:1, was milled with 16½ parts of mixed mono- and diisoamyl acid phosphate and 16½ parts of benzene phosphinic acid at a temperature of 130° C. until a homogeneous mass was obtained. The homogeneous was calendered into sheets 15 mils thick at the same temperature. Glass plate laminates 3″ x 3″ were prepared from the sheet by first sealing the edges at a temperature of 110° C. under light pressure and then uniformly heating the laminates at a temperature of 165–175° C. under a pressure 225 p.s.i. for a period of 11 minutes. The resulting laminate was optically clear. The energy required for a missile to penetrate a 3″ x 3″ glass laminate at −18° C. was 170,000 gram centimeters as compared to 40,000 gram centimeters for a commercial polyvinyl butyral laminate.

The optical properties of laminates made with the modified hydrolyzed ethylene-vinyl acetate polymers of this invention are equivalent to those made from polyvinyl butyral resins as measured by light adsorption, haze, and yellowness of the laminate. In comparison to unmodified hydrolyzed interpolymers of ethylene and vinyl acetate, the modified interpolymer laminates possess significantly improved optical properties. Weathering experiments on laminates made as described in the examples have shown that the laminates of the modified compositions of this invention are stable to light, heat, and moisture to a degree equivalent to laminates made from polyvinyl butyral resins. In contrast to unmodified interpolymers of ethylene and hydrolyzed vinyl acetate they do not embrittle on long term exposure and do not lose their adhesiveness and toughness. Prior to curing the modified interpolymers the polymers have a tendency to lose some of the modifiers through exudation and should therefore be stored in a cool, moisture-free area.

Various methods may be employed to admix the modifier with the hydrolyzed interpolymer, such as milling or solution in a common solvent. Other methods known to those skilled in the art of compounding plastics will be apparent. It is important to control the temperature during such mixing operations to below 140° C. to avoid any significant cross-linking. The compounded compositions may be fabricated into the desired shapes by such operations as molding, calendering, extrusion or solution casting, however in such operations again the temperatures should not be increased over 140° C. to avoid cross-linking. The compositions of this invention may be further modified if it is desired to do so with additional plasticizing or stabilizing agents and dyes.

The modified interpolymers of ethylene and hydrolyzed vinyl acetate of this invention are primarily designed for the bonding of glass. In contrast to unmodified compositions of the interpolymer the compositions of this invention maintain excellent adhesion to glass and toughness at low and high temperatures. The optical properties are improved. Heat, light and moisture resistance is improved and equivalent to that obtained with polyvinyl butyral laminates. The compositions do not embrittle or separate on long term exposure. Important advantages over polyvinyl butyral are obtained. The compositions of this invention are non-tacky, dimensionally more stable to temperature, thus facilitating production of the laminates. Laminates are increased in strength thus improving handling facility and causing less breakage during installation. Higher temperatures may be used with laminates made from the modified hydrolyzed ethylene vinyl acetate interpolymers without decreasing toughness or adhesion.

As many apparently widely different embodiments of this invention may be made without departing from the scope thereof it is to be understood that the invention is not limited to the specific embodiments thereof, except as defined in the appended claims.

We claim:

1. A plastic composition comprising an 80–100% hydrolyzed interpolymer of ethylene with a vinyl ester of an organic carboxylic acid in which the molar ratio of the ethylene to the vinyl ester is from 1.5/1 to 5/1 containing from 20 to 40% by weight of the total composition of an acidic hydrogen containing compound of the class consisting of alkyl acid ortho-phosphates, alkyl acid ortho-phosphites and benzene phosphinic acid, wherein the hydrocarbon radicals contain at least 3 and not more than 12 carbon atoms.

2. A plastic composition as set forth in claim 1 wherein the molar ratio is 3/1.

3. A plastic composition comprising an essentially completely hydrolyzed interpolymer of ethylene with vinyl acetate in which the molar ratio of ethylene to the vinyl ester is from 1.5/1 to 5/1 containing from 25 to 35% by weight of the total composition of a mixture of organic phosphorus compounds having at least one acidic hydrogen, said organic phosphorus compounds being members of the class consisting of alkyl acid ortho-phosphates, alkyl acid ortho-phosphites and benzene phosphinic acid, wherein the hydrocarbon radicals contain at least three and not more than 12 carbon atoms.

4. A plastic composition comprising an essentially completely hydrolyzed interpolymer of ethylene with vinyl acetate in which the molar ratio of the ethylene to the vinyl ester is from 1.5/1 to 5/1 containing from 25 to 35% by the weight of the total composition of an alkyl acid ortho-phosphite, wherein the alkyl radicals contain at least 3 and not more than 12 carbon atoms.

5. A plastic composition as set forth in claim 4 wherein the alkyl acid phosphite is dioctyl phosphite.

6. A plastic composition comprising an essentially completely hydrolyzed interpolymer of ethylene with vinyl acetate in which the molar ratio of the ethylene to the vinyl acetate is from 1.5/1 to 5/1 containing from 25 to 35% by weight of the total composition of an alkyl acid ortho-phosphate, wherein the alkyl radicals contain at least 3 and not more than 12 carbon atoms.

7. A plastic composition as set forth in claim 6 wherein the alkyl acid phosphate is a mixture of mono- and diisoamyl phosphate.

8. A plastic composition comprising an essentially completely hydrolyzed interpolymer of ethylene with vinyl acetate in which the molar ratio of the ethylene to the vinyl acetate is from 1.5/1 to 5/1 containing from 25 to 35% by weight of the total composition of benzene phosphinic acid.

9. A crosslinked safety glass interlayer composition comprising an essentially completely hydrolyzed interpolymer of ethylene and vinyl acetate in which the molar ratio of the ethylene to the vinyl acetate is from 1.5/1 to 5/1 crosslinked with 25 to 35% by the weight of the total composition of at least one organic phosphorus compound, said organic phosphorus containing compound having at least one acidic hydrogen and being a member of the class consisting of alkyl acid ortho-phosphites, alkyl acid ortho-phosphates and benzene phosphinic acid wherein the hydrocarbon radicals contain at least 3 and not more than 12 carbon atoms, said crosslinking having been achieved by heating said interlayer to a temperature of 160° to 190° C.

10. A composition as set forth in claim 9 wherein the crosslinking agent is dioctyl phosphite.

11. A composition as set forth in claim 9 wherein the crosslinking agent is a mixture of mono- and diisoamyl phosphate.

12. A composition as set forth in claim 9 wherein the crosslinking agent is benzene phosphinic acid.

13. A laminated safety glass comprising at least two sheets of glass having therebetween a flexible, tough, transparent interlayer of an essentially completely hydrolyzed polymer of ethylene and vinyl acetate having a molar ratio of ethylene to vinyl acetate from 1.5/1 to 5/1 crosslinked with 25 to 35% by weight of the total composition of an organic phosphorus compound having at least one acidic hydrogen, said organic phosphorus containing compound being a member of the class consisting of alkyl acid ortho-phosphates and alkyl acid ortho-phosphites and benzene phosphinic acid wherein the hydrocarbon radicals contain at least 3 and not more than 12 carbon atoms, said crosslinking having been achieved by heating said interlayer to a temperature of 160° to 190° C.

14. The process of preparing laminated safety glass comprising admixing an essentially completely hydrolyzed ethylene vinyl acetate interpolymer having a molar ratio of ethylene to vinyl acetate from 1.5/1 to 5/1 with 25 to 35% by weight of the total composition of an organic phosphorus compound having at least one acidic hydrogen, said organic phosphorus containing compound being a member of the class consisting of alkyl acid ortho-phosphates, alkyl acid ortho-phosphites and benzene phosphinic acid wherein the hydrocarbon radicals contain at least 3 and not more than 12 carbon atoms at a temperature from 100 to 130° C., and thereupon crosslinking and laminating said composition in sheet form between two layers of glass at a temperature of 160 to 190° C.

References Cited in the file of this patent

UNITED STATES PATENTS

| | | |
|---|---|---|
| 2,386,347 | Roland | Oct. 9, 1945 |
| 2,516,980 | Gray et al. | Aug. 1, 1950 |
| 2,557,805 | Upson | June 19, 1951 |
| 2,657,201 | Nebel | Oct. 27, 1953 |